United States Patent
Linton et al.

(10) Patent No.: US 8,694,648 B2
(45) Date of Patent: Apr. 8, 2014

(54) SYSTEM AND METHOD FOR IMPLEMENTING A SESSION INITIATION PROTOCOL FEATURE

(75) Inventors: Daniel P. Linton, Apex, NC (US); Craig P. Miller, Raleigh, NC (US); Pandit Panburana, Cary, NC (US); Stephen Levy, Cary, NC (US); Christopher E. Pearce, Dallas, TX (US)

(73) Assignee: Cisco Technology, Inc., San Jose, CA (US)

( * ) Notice: Subject to any disclaimer, the term of this patent is extended or adjusted under 35 U.S.C. 154(b) by 177 days.

(21) Appl. No.: 13/173,655

(22) Filed: Jun. 30, 2011

(65) Prior Publication Data
US 2011/0264814 A1 Oct. 27, 2011

Related U.S. Application Data

(63) Continuation of application No. 11/427,156, filed on Jun. 28, 2006, now Pat. No. 8,015,305.

(51) Int. Cl.
*G06F 15/16* (2006.01)
*H04L 12/16* (2006.01)

(52) U.S. Cl.
USPC .......................................... 709/227; 370/260

(58) Field of Classification Search
USPC .......................................... 709/227; 370/260
See application file for complete search history.

(56) References Cited

U.S. PATENT DOCUMENTS

| | | | |
|---|---|---|---|
| 3,963,874 A | 6/1976 | Pommerening et al. | 179/18 |
| 4,809,321 A | 2/1989 | Morganstein et al. | 379/211 |
| 6,501,750 B1 | 12/2002 | Shaffer et al. | 370/353 |
| 6,510,162 B1 | 1/2003 | Fijolek et al. | 370/432 |
| 6,546,087 B2 | 4/2003 | Shaffer et al. | 379/90.01 |
| 6,567,505 B1 | 5/2003 | Omori et al. | 379/84 |
| 6,601,099 B1 | 7/2003 | Corneliussen | 709/224 |
| 6,614,899 B1 | 9/2003 | Sollee et al. | 379/218.01 |
| 6,615,236 B2 | 9/2003 | Donovan et al. | 709/203 |
| 6,625,141 B1 | 9/2003 | Glitho et al. | 370/352 |
| 6,636,594 B1 | 10/2003 | Oran | 379/201.01 |
| 6,658,095 B1 | 12/2003 | Yoakum et al. | 379/93.01 |
| 6,661,799 B1 | 12/2003 | Molitor | 370/401 |
| 6,665,723 B2 | 12/2003 | Trossen | 709/227 |

(Continued)

OTHER PUBLICATIONS

R. Mahy, et al., "The Session Initiation Protocol (SIP) Join Header," The Internet Society, http://www.ietf.org/rfc/rfc3911.txt, pp. 1-16, Oct. 2004.

(Continued)

*Primary Examiner* — Asghar Bilgrami
(74) *Attorney, Agent, or Firm* — Baker Botts L.L.P.

(57) ABSTRACT

A method for implementing a SIP feature includes, in particular embodiments, establishing a communication session via a communications platform between a first and second user and receiving a request from a third user to join the communication session. The second and third users are from a plurality of users using a shared line. The method further includes integrating communications of the third user into the communication session. In particular embodiments the method includes establishing a communication session between a first and second user via a communications platform. The method also includes receiving a select request that locks the communication session so that a third user cannot resume the communication session with the first user. In particular embodiments the method includes receiving a request from a first user of a shared line to enable a privacy feature that reduces call information generated by the communications platform in remote state notifications.

22 Claims, 2 Drawing Sheets

(56) References Cited

U.S. PATENT DOCUMENTS

| | | | |
|---|---|---|---|
| 6,678,735 B1 | 1/2004 | Orton et al. | 709/230 |
| 6,684,147 B2 | 1/2004 | Park et al. | 701/71 |
| 6,731,625 B1 | 5/2004 | Eastep et al. | 370/352 |
| 6,738,390 B1 | 5/2004 | Xu et al. | 370/467 |
| 6,754,181 B1 | 6/2004 | Elliott et al. | 370/252 |
| 6,760,322 B1 | 7/2004 | Fukuda et al. | 370/352 |
| 6,785,246 B2 * | 8/2004 | Foti | 370/261 |
| 6,788,676 B2 | 9/2004 | Partanen et al. | 370/352 |
| 6,816,469 B1 * | 11/2004 | Kung et al. | 370/260 |
| 6,870,916 B2 * | 3/2005 | Henrikson et al. | 379/202.01 |
| 7,116,971 B2 * | 10/2006 | Chapman et al. | 455/412.1 |
| 7,664,861 B2 * | 2/2010 | Guntupalli et al. | 709/227 |
| 2005/0207361 A1 * | 9/2005 | Rosenberg et al. | 370/282 |
| 2005/0262249 A1 * | 11/2005 | Koskelainen | 709/229 |
| 2006/0007954 A1 | 1/2006 | Agrawal et al. | 370/466 |
| 2007/0047699 A1 * | 3/2007 | Yuhanna et al. | 379/93.09 |

OTHER PUBLICATIONS

R. Mahy, et al., "The Session Initiation Protocol (SIP) "Replaces" Header," The Internet Society, http://www.ietf.org/rfc/rfc3891.txt, pp. 1-15, Sep. 2004.

Soroushnejad, "Implementing Bridged Line Appearances (BLA) Using Session Initiation Protocol (SIP)," Yahoo, Inc., http://www.potaroo.net/ietf/draft-anil-sipping-bla/, pp. 1-36, Jun. 15, 2006.

Rosenberg et al., "An Invite Inititiated Dialog Event Package for the Session Initiation Protocol (SIP)," SIP Edge LLC, http://www.ietf-sipping-dialog-package/, pp. 1-38, Apr. 12, 2005.

Schulzrinne et al., "Session Initiation Protocol (SIP)-H.323 Interworking Requirements," The Internet Society, http://www.ietf.org/rfc/rfc4123.txt, pp. 1-15, Jul. 2005.

Rosenberg and et al., "An Offer/Answer Model with the Session Description Protocol (SDP)," The Internet Society, http://www.ietf.org/rfc/rfc3264.txt, pp. 1-24, Jun. 2002.

Rosenberg, et al., "Caller Preferences for the Session Initiation Protocol (SIP)," The Internet Society, http://www.ietf.org/rfc/rfc3841.txt, pp. 1-25, Aug. 2004.

Schulzrinne et al., "RTP Payload of DTMF Digits, Telephony Tones and Telephony Signals," The Internet Society, http://tools.ietf.org/html/rfc2833, pp. 1-27, May 2000.

A.B. Roach, "Session Initiation Protocol (SIP)-Specific Event Notification," The Internet Society, http://www.ietf.org/rfc/rfc3265.txt, pp. 1-34, Jun. 2005.

Mahy et al., "Remote Call Control in the Session Initiation Protocol (SIP) Using the Refer Method and the Session-Oriented Dialog Package," http://www.ietf.org/internet-drafts/draft-mahy-sip-remote-cc-03.txt, pp. 1-14, Mar. 5, 2006.

Mahy et al., Remote Call Control in SIP using the Refer Method and the Session-Oriented Dialog Package, pp. 1-35, Feb. 2004.

Rosenberg et al., "SIP: Session Initiation Protocol ," The Internet Society, RFC 3261, pp. 1-269, Jun. 2002.

* cited by examiner

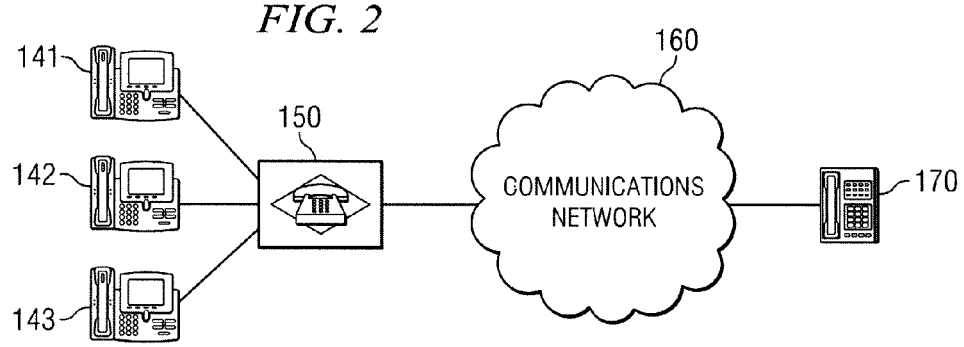
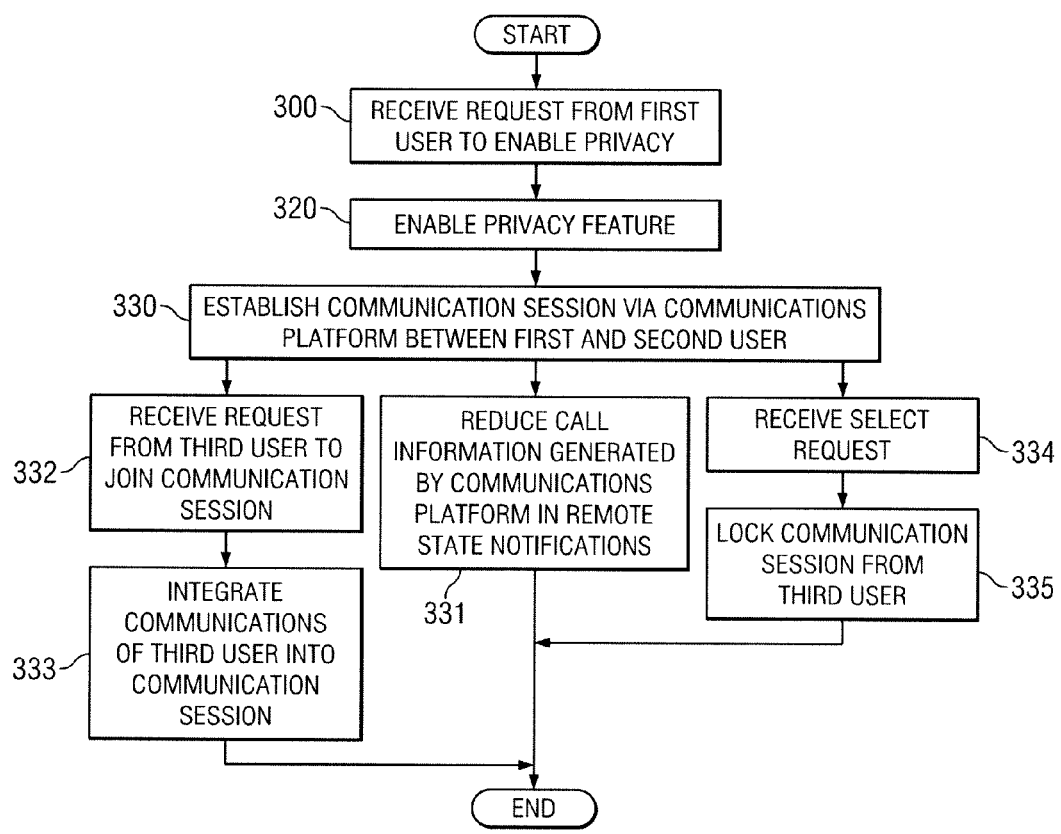

SYSTEM AND METHOD FOR IMPLEMENTING A SESSION INITIATION PROTOCOL FEATURE

CROSS-REFERENCE TO RELATED APPLICATION

This application is a continuation of U.S. application Ser. No. 11/427,156 filed Jun. 28, 2006 and entitled "System and Method for Implementing a Session Initiation Protocol Feature".

TECHNICAL FIELD OF THE INVENTION

This invention relates generally to communications and, more particularly, to a system and a method for implementing a session initiation protocol (SIP) feature.

BACKGROUND OF THE INVENTION

The field of communications has become increasingly important in today's society. In particular, the ability to quickly and effectively interact with an individual (through any suitable communications media) presents a significant obstacle for component manufacturers, system designers, and network operators. This obstacle is made even more difficult due to the plethora of diverse communication technologies (e.g. Instant Messaging, cellular communications, simple voice sessions, etc.) that exist in the current marketplace. These different communications technologies may use different procedures or protocols in establishing communication sessions and implementing various features associated with the communication technology. This further complicates attempts to interconnect devices utilizing different communications technologies.

As new communications technologies become available to the consumer, new protocols need to be developed in order to optimize this emerging technology. One problem often encountered is implementing new features in a communications platform that uses an older, standardized, protocol such as session initiation protocol (SIP). More specifically, a communications platform used in implementing a Shared Line protocol or paradigm has features that may not directly correspond with SIP.

SUMMARY OF THE INVENTION

From the foregoing, it may be appreciated by those skilled in the art that a need has arisen for an improved process that provides an effective solution for implementing SIP features.

In accordance with an embodiment of the present invention, a method for implementing a Session Initiation Protocol feature includes establishing a communication session via a communications platform. The communication session is between a first user and a second user. The second user is one of a plurality of users using a shared line. The method also includes receiving a request from a third user of the plurality of users to join the communication session between the first user and the second user. The method further includes integrating communications of the third user into the communication session between the first user and the second user. Where the method includes receiving a request from a third user, the request from the third user may include an invite with a join header and a call info header.

In accordance with another embodiment of the present invention, a method for implementing a Session Initiation Protocol feature includes receiving a request from a first user to enable a privacy feature. The first user is one of a plurality of users using a shared line supported by a communications platform. The method also includes reducing call information generated by the communications platform in remote state notifications by enabling the privacy feature. Where the method includes receiving a request from a first user to enable the privacy feature the request from the first user comprises a remote call control line key event message specifying a privacy status.

In accordance with another embodiment of the present invention, a method for implementing a Session Initiation Protocol feature includes establishing a communication session via a communications platform. The communication session is between a first user and a second user. The second user is one of a plurality of users using a shared line. The method also includes receiving a request from the second user to invoke a select feature. The select feature locks the communication session between the first user and the second user so that a third user, of the plurality of users using the shared line, cannot resume the communication session with the first user.

In particular embodiments, where the method includes receiving a request from the second user to invoke a select feature, the request may include a remote call control soft key message, specifying select. In some embodiments the request may be generated by the communications platform when the communication session is placed on hold.

Certain embodiments of the present invention may provide a number of technical advantages. For example, according to one embodiment of the present invention, a remote user can barge into an existing call over a shared line. Accordingly, where one user picks up the call, another user may enter the call without the first user having to take any action. As another example, according to an embodiment of the present invention a user of a shared line may enable a privacy feature that limits the information provided by remote state notifications sent to the other users of the shared line. Accordingly, a user of a shared line may have some privacy for some calls. As yet another example, according to an embodiment of the present invention a user of a shared line can select a call before placing it on hold. Accordingly, a different user of the shared line cannot resume the call.

Certain embodiments of the present invention may enjoy some, all, or none of these advantages. Other technical advantages may be readily apparent to one skilled in the art from the following figures, description, and claims.

BRIEF DESCRIPTION OF THE FIGURES

To provide a more complete understanding of the present invention and features and advantages thereof, reference is made to the following description, taken in conjunction with the accompanying figures, wherein like reference numerals represent like parts, in which:

FIG. 2 is a simplified block diagram that illustrates an operation of the communications platform of FIG. 1; and FIG. 3 is a flowchart depicting a method for implementing SIP features in accordance with particular embodiments of the present invention.

DETAILED DESCRIPTION OF THE INVENTION

Figure 1:
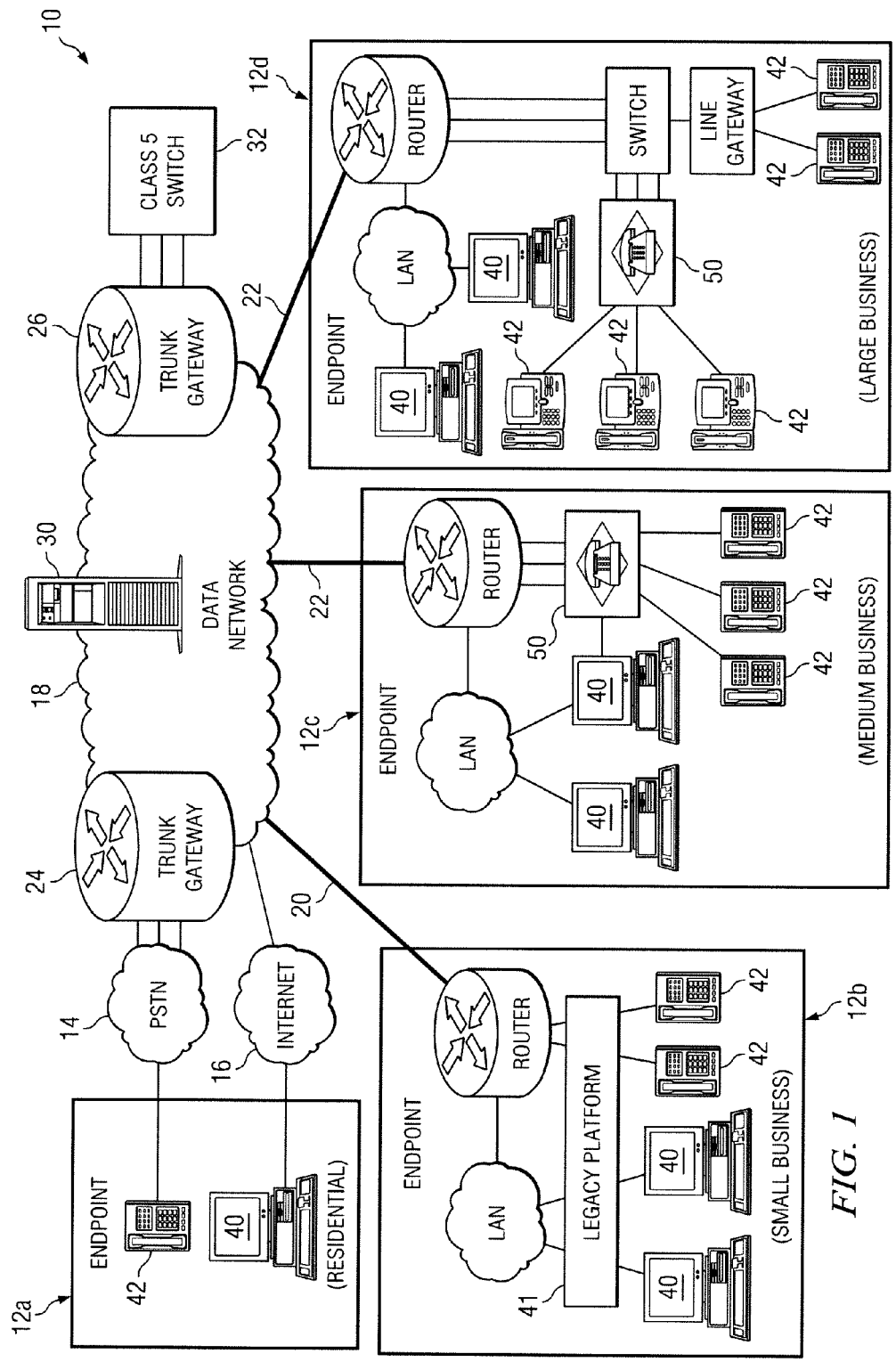
FIG. 1 is a simplified block diagram illustrating a communication system that may implement a session initiation protocol feature in accordance with one embodiment of the present invention.

FIG. 1 is a simplified block diagram of a communication system 10 for communicating, receiving, and/or transmitting data in a session initiation protocol (SIP) environment. Communication system 10 includes endpoints 12a-12d, public switched telephone network (PSTN) 14, Internet 16, data network 18, broadband access link 20, and a number of additional links 22 (which may include, for example, a digital subscriber line (DSL) link, a T1 link, a fiber optic link, and/or a wireless link). Communication system 10 also includes a set of trunk gateways 24 and 26, a 3rd-party application server 30, and a Class-5 switch 32. In accordance with the teachings of the present invention, the components of FIG. 1 may interact in order to perform barge, privacy and/or select features, as further detailed below.

Endpoint 12a represents a residential location, which consists of a computer 40 and a telephone 42. Telephone 42 may be an Internet protocol (IP) telephone or a standard telephone that is operable to interface with computer 40 such that one or more capabilities of SIP are enabled through telephone 42. Accordingly, telephone 42 may be one of two types of telephones. Endpoint 12b represents a small business entity, which consists of a local area network (LAN), a router, legacy platform 41, several computers 40, and several telephones 42. Endpoint 12c represents a medium business entity, which consists of a LAN, a router, a private branch exchange (PBX) or key system (not shown), communications platform 50, several computers 40, and several telephones 42. Endpoint 12d is a large business entity, which consists of a LAN, a router, a switch, a line gateway, communications platform 50, several computers 40, and several telephones 42.

Endpoints 12a-d are SIP-compatible elements that include hardware and/or software that is operable to receive and to transmit data (directly or indirectly). Note that the term "endpoint" encompasses a myriad of potential devices and infrastructure that may benefit from the operations of communication system 10. Endpoints 12a-d may include a personal digital assistant (PDA), a cellular telephone, a standard telephone (which may be coupled to a personal computer) an IP telephone, a personal computer, a laptop computer, a mobile telephone, or any other suitable device or element (or any appropriate combination of these elements) that is operable to receive data or information. Each endpoint may also include suitable network equipment and appropriate infrastructure (e.g., switches, routers, LANs, gateways, etc.) to facilitate a SIP session. FIG. 1 illustrates only one set of example devices that may be used within communication system 10. The present invention is replete with numerous alternatives that could be used to facilitate the operations of communication system 10.

It should also be noted that the internal structure of endpoints 12a-d are malleable and can be readily changed, modified, rearranged, or reconfigured in order to achieve their intended operations. As identified supra, software and/or hardware may reside in endpoints 12a-d in order to achieve the teachings discussed herein. However, due to their flexibility, these elements may alternatively be equipped with (or include) any suitable component, device, application specific integrated circuit (ASIC), processor, microprocessor, algorithm, read-only memory (ROM) element, random access memory (RAM) element, erasable programmable ROM (EPROM), electrically erasable programmable ROM (EEPROM), field-programmable gate array (FPGA), or any other suitable element or object that is operable to facilitate the operations thereof. Considerable flexibility is provided by the structure of endpoints 12a-d in the context of communication system 10 and, accordingly, it should be construed as such.

For purposes of teaching and discussion, it is useful to provide some overview as to the way in which the following invention operates in a SIP environment. The following foundational information may be viewed as a basis from which the present invention may be properly explained. Such information is offered earnestly for purposes of explanation only and, accordingly, should not be construed in any way to limit the broad scope of the present invention and its potential applications.

There are many applications that require the creation and management of a session, where a session is considered an exchange of data between an association of participants. Furthermore, a communication session shall include the sending or receiving of any type of media transmitted using any audio, video and/or data means through any suitable technology such as voice devices or instant messaging. The implementation of these applications is complicated by the practices of participants: users may move between endpoints, they may be addressable by multiple names, and they may communicate in several different media: in many cases simultaneously. Certain protocols have been developed to carry various forms of real-time multimedia session data such as voice, video, or text messages.

The SIP features of communication system 10 work in concert with these protocols by enabling endpoints (generally referred to as "user agents") to discover one another and to agree on a characterization of a session they would like to share. For locating prospective session participants, and for other functions, SIP enables the creation of an infrastructure of network hosts (generally referred to as proxy servers) to which user agents can send registrations, invitations to sessions, and other requests. In some embodiments communications platforms (e.g. communications platform 50) may be used instead of proxy servers. A communications platform may perform all the same functions as a proxy server as well as some additional functions. SIP is an agile, general-purpose tool for creating, modifying, and terminating sessions. SIP works independently of underlying transport protocols and without dependency on the type of session that is being established.

SIP may be used in creating a shared line environment in which several IP phones may share a single line. A communications device that is part of a shared line may receive status updates, sometimes referred to as remote state notifications, that let all the devices sharing the line know what all the other devices are doing.

SIP is an application-layer control protocol that can establish, modify, and terminate multimedia sessions (conferences) such as Internet telephony calls. SIP can also invite participants to already existing sessions, such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both called and calling party locations; and 5) session management: including transfer and termination of sessions, modifying session parameters, and invoking services.

A standard SIP platform does not provide services. Rather, SIP provides primitives that can be used to implement different services. For example, SIP can locate a user and deliver an opaque object to his current location. If this primitive is used to deliver a session description written in SDP, for instance, the endpoints can agree on the parameters of a session. If the same primitive is used to deliver a photo of the caller as well as the session description, a "caller ID" service can be easily implemented.

Since SIP messages and the sessions they establish can pass through entirely different networks, SIP cannot, and does not, provide any kind of network resource reservation capabilities. Quality of service (QoS) parameters may also be accommodated by SIP (e.g., see RFC 3311).

The nature of the services provided make security particularly important. To that end, SIP provides a suite of security services, which include denial-of-service prevention, authentication (both user to user and proxy to user), integrity protection, and encryption and privacy services.

As mentioned above, SIP may be used in a shared line environment. Unfortunately not all the features implemented in a shared line environment directly match up with a corresponding SIP feature. Thus, implementing certain shared line features using SIP may require additional or modified instructions/messages. According to the teachings of the present invention, three example shared line features include a barge feature, a privacy feature and a select feature.

FIG. 2 is a simplified block diagram that illustrates an operation of communications platform 50 of FIG. 1. In FIG. 2 communications platform 150 has been depicted in a simplified example of a communications network. Connected to one end of communications platform 150 are three IP phones 141-143. These IP phones are able to communicate with telephone 170 via communications platform 150 which is connected to communications network 160. Communications network 160 may include several separate, but interconnected communications networks. For example, in connecting communications platform 150 to telephone 170, communications network 160 may comprise a LAN that couples communications platform 150 to the Internet, which in turn is coupled to a PSTN that services telephone 170. Communications network 160 is intended to represent any number, type size or group of communication networks, thus communications platform 150 and telephone 170 may be in two different locations anywhere in the world and are able to pass communications between each other via the various communications networks represented by communication network 160.

In the embodiment depicted in FIG. 2, communications platform 150 supports three telephones 141-143 via a shared line. In a shared line environment, a single IP phone line may service multiple IP phones. Using a shared line may provide many unique features not readily available with a regular phone having its own line. Communications platform 150 may implement some of these features by, in some way, using remote state notifications that are sent to the telephones sharing the line. Remote state notifications may provide such information as who is on a call, who they are talking with, whether the call is active or on hold. For example, in a shared line environment if one telephone places a call on hold, another telephone can resume it. Thus, using information provided by the remote state notifications, another user can determine whether he wants to resume a held call.

The following examples are designed to help illustrate some of the features enabled by the present invention. The situations set forth in these examples are in no way the only situations in which the features of the present invention may be used, nor are they intended to limit any of the features of the present invention that may be disclosed herein.

In the first example assume that IP phone 141 and telephone 170 are currently involved in a communication session. Upon establishing the communication session, communications platform 150 may send a remote state notification informing IP phones 142 and 143 that IP phone 141 is currently involved in a communication session with telephone 170 (the remote state notifications may contain additional information as well). Further assume that a user of IP phone 142 has received the remote state notification for the call between IP phone 141 and telephone 170 (or otherwise learned of the call) and wants to join the call. To do so, the user of IP phone 142 may press a button, or otherwise select a barge feature, and then select his barge target, in this case IP phone 141. In response to invoking the barge feature, IP phone 142 may send an INVITE with a Join header. The Join header specifies the dialog between IP phone 141 and communications platform 150. Because IP phone 142 shares the same line as IP phone 141 it would have previously received the dialog id to use in the Join header via the remote state notification. The INVITE may also contain a Call-Info header that specifies the type of barge feature. For example, in particular embodiments communications platform 150 may support Barge and cBarge.

If communications platform 150 accepts the INVITE with the Join header it will generate an independent INVITE with a Join header that is sent to IP phone 141. The INVITE with the Join header may trigger mixing, thus allowing the three phones to communicate with one another. Besides mixing the communications, communications platform 150 may also send updated state notifications to the other IP phones. The barged call may be considered yet another call on the shared line.

If IP phone 142 wants to drop out of the call, while IP phone 141 and telephone 170 want to continue the call, IP phone 142 may only need to terminate his end of the call (e.g. hang-up). In doing so, the call established using the INVITE with a Join header may be terminated (e.g. BYE'd) but the original call, between IP phone 141 and 170, may remain intact (allowing IP phone 141 and telephone 170 to continue their conversation). The next set of state notifications that are sent may reflect these changes. On the other hand, if IP phone 141 wants to drop out of the barged-in call but IP phone 142 and telephone 170 want to continue to talk, communications platform 150 may use REFER with embedded replaces. The REFER may be sent in-dialog to the original call. The barged-in call is specified in the embedded Replaces header.

As mentioned above, a Call-Info header may be used to specify between the different barge features, such as whether to use Barge or cBarge. From the phone's perspective, Barge and cBarge are similar, however, internally, there are differences. For example, if an INVITE with a Join header and Call-Info header specifying cBarge (e.g. "Call-Info: <urn.X-cisco-remotecc:cbarge>") is accepted by communications platform 150, it may use a combination of reINVITEs and UPDATEs to get the various phones bridged together.

In a second example assume that IP phone 141 has enabled a privacy feature. The privacy feature is a device based feature versus being a line or call based feature. Thus, if the privacy feature has been enabled by IP phone 141, then (from that point on) any remote state notifications, based on calls involving IP phone 141, that are sent may contain reduced information as discussed below. Because the privacy feature is not call specific, it will remain enabled for all remote state notifications generated (for calls involving IP phone 141) until IP phone 141 disables the privacy feature. Furthermore, because the privacy feature is not line specific, the remote state notifications for calls involving IP phones 142 and 143 may be unaffected by 141 invoking the privacy feature.

Privacy can be enabled or disabled by an endpoint using a remote call control line key event message specifying privacy and a status of on (enabled) or off (disabled). Furthermore, the privacy feature may be enabled or disabled during an active call or while the phone is idle. Once enabled, the privacy feature works the same for incoming and outgoing communication sessions. The reduced call information may merely notify the other IP phones, IP phones 142 and 143, that there is a currently active call using the shared line.

In the third example, assume again that IP phone 141 and telephone 170 have begun a communication session with each other. Further assume that IP phone 141 has placed the call on hold. In a shared line environment, under normal circumstances, once IP phone 141 has placed the call on hold, any of the other endpoints sharing the line may resume the call. This is also true where communications platform 150 places a call on hold, for example when IP phones 141-143 are currently busy and communications platform 150 places the call on hold to wait for one of the phones to become available.

There may be instances in which IP phone 141 may want to place the call on hold, but does not want anybody else to resume it. Similarly, there may be instances in which communications platform 150 only wants a certain endpoint to be able to pick-up a call. In these instances IP phone 141 (or communications platform 150) may enable a select feature for the call before she places it on hold. To select the call, IP phone 141 may send a remote call control soft key event message specifying Select. The select feature is call based and allows a particular call to be locked such that other IP phones sharing the line cannot remotely resume the held call. Upon receiving the request to enable the select feature, communications platform 150 may send updated remote state notifications to the other endpoints sharing the shared line.

It should be noted that the configuration of the system of FIG. 2 is malleable and can be readily changed, modified, rearranged, or reconfigured in order to achieve its intended operations or additional operations. Additionally, any of the items within FIG. 2 may be combined, where appropriate, or replaced with other functional elements that are operable to achieve any of the operations described herein.

FIG. 3 is a flowchart depicting a method for implementing a SIP feature in accordance with particular embodiments of the present invention. More specifically, the flowchart of FIG. 3 depicts implementing a barge feature, a privacy feature and a select feature in a shared line environment. While this flowchart depicts all three features in a single flow, it should be understood that any particular flow may use one, two, three or none of the features depicted.

If a user enables the privacy feature before a call is received, a communications platform may go through steps 300-331. If she wants to invoke a barge feature on another call, the communications platform may go through steps 330 and 332-333. If she wants to enable a select feature for her current call as she places her call on hold, the communications platform may go through steps 330 and 334-335. It should be noted that while the flowchart shows the steps for invoking a barge feature (steps 330 and 332-333) and for enabling a select feature (steps 330 and 334-335) as coming after receiving and enabling the privacy feature (steps 300 and 320), these steps (for privacy) are not required to enable either the barge or select features.

Beginning with step 300, the communications platform receives a request from a first user of a shared line to enable privacy. The request may include a remote call control line key event message specifying a privacy status. Upon receiving the request, at step 320 the communications platform enables the privacy feature. This feature is specific to the device that sent the request, as opposed to being specific to a particular call, or to a particular line. Thus, if a first user enables privacy, all calls involving the first user's communication device will be private. This means that other users of the shared line may only be able to see that there is a currently active call on the shared line.

At step 330 a communication session is established between the first user and a second user. Whether the first or second user is the initiator of the call, the call itself will be considered private as long as the first user has enabled the privacy feature and is involved in the call. At step 331, the information in the remote state notification concerning the current call is reduced so that the other users are only able to see that there is an active call. Upon establishing the communication session, remote state notifications are sent to the other users sharing the shared line using the reduced information determined at step 331.

While in the depicted method, the privacy request is received before the communication session is established, it is entirely possible for the privacy request to be received during a communication session: in which case updated remote state notifications may be sent that reduce the amount of information concerning the current call that is displayed to the other users of the shared line. Furthermore, after enabling the privacy feature, step 320, the reduction of call information in step 331 may be applied to subsequent calls as well. This may continue until such time as the privacy feature is disabled. If the user who enabled the privacy feature wants to disable it, she may go through similar steps as used to enable the privacy feature, only instead of enabling the privacy feature it will disable the privacy feature.

If the privacy feature has not been enabled by the first user, or if the third user otherwise knows that there is a call between the first user and the second user then, at step 332, the third user may, if he wishes, request to join in the communication session established at step 330. Depending on the device that the third user is using, the request may comprise an INVITE with a Join and a Call-Info header. Furthermore, the Call-Info header may specify whether the request is a Barge request (e.g. "Call-Info: <urn:X-cisco-remotecc:barge>") or a cBarge request (e.g. "Call-Info: <urn:X-cisco-remotecc:cbarge>"). If the INVITE does not include a Call-Info header, or if the Call-Info header does not specify the type of barge being requested, the communications platform may presume that the request was for cBarge. As mentioned above, the difference between Barge and cBarge is not readily apparent from the user's perspective, but does change the way the communications platform integrates the communications in step 333. If the request is granted by the communications platform, then, at step 333, the third user's communications are integrated into the communication session between the first user and the second user. This is similar to having a conference call or a three-way call in that all three users are able to communicate with each other. If the request was Barge, then the communications platform may use the INVITE with Join received from the third user to generate its own INVITE with Join that it sends to the first user. If the request was cBarge then the communications platform may use combinations of reINVITE and UPDATE. reINVITE and UPDATE may be used to update a display of an endpoint to display, for example "To Conference." reINVITE and UPDATE may also be used to alter the audio media path to be sent and received from a central conference bridge.

After the communication session has been established between the first user and the second user (regardless of whether a request to enable privacy has been received) at step 330, something may come up that requires the first user to place the second user on hold. Because the first user is using a shared line, any of the other users on the shared line may be able to resume the call, after the first user has placed it on hold. If the first user wants to prevent any of the other users from resuming her call, she may lock the call by sending a select request, which is received at step 334. The request to lock the call may include a remote call control soft key event message that specifies Select.

Once the communications platform receives the Select request, at step 335, the communications platform may lock the current call. This prevents a third user from resuming the call. Unlike the Privacy feature, Select is call based, thus the first user can only prevent other users from resuming the current call, she can not activate a Select for her particular phone.

It is important to note that the stages and steps in FIG. 3 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the present invention. Accordingly, communications capabilities, data processing features and elements, suitable infrastructure, and any other appropriate software, hardware, or data storage objects may be included within communication system 10 to effectuate the tasks and operations of the elements and activities associated with executing the barge, privacy and/or select features.

Although the present invention has been described in detail with reference to particular embodiments, it should be understood that various other changes, substitutions, and alterations may be made hereto without departing from the spirit and scope of the present invention. The illustrated network architecture of FIGS. 1 and 2 has only been offered for purposes of example and teaching. Suitable alternatives and substitutions are envisioned and contemplated by the present invention: such alternatives and substitutions being clearly within the broad scope of communication system 10. For example, the use of the LAN could easily be replaced by a virtual private network (VPN), a metropolitan area network (MAN), a wide area network (WAN), a wireless LAN (WLAN), or any other element that facilitates data propagation for endpoints 12*a-d*. Using analogous reasoning, the routers and switches illustrated by FIG. 1 may be supplanted by bridges, gateways, or any other suitable devices that are conducive to network communications. In addition, while the foregoing discussion has focused on SIP, any other suitable session protocol may benefit from the teachings provided herein. The present invention is not confined to the SIP platform.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method for implementing a Session Initiation Protocol (SIP) feature, comprising:

providing a shared line implementing a shared line protocol to serve a plurality of endpoints coupled to the shared line, the plurality of endpoints comprising at least a first endpoint and a second endpoint;

establishing a SIP communication session via a communications platform, the communication session being between the first endpoint and a third endpoint, the communications platform implementing the shared line protocol to serve a plurality of endpoints using a single shared line, the third endpoint not one of the plurality of endpoints being served by the single shared line;

after establishing the SIP communication session between the first endpoint and the third endpoint, sending, via the communications platform, a remote state notification comprising call information notifying the plurality of endpoints served by the single shared line of the SIP communication session;

receiving a request from the second endpoint to join the SIP communication session between the first endpoint and the third endpoint; and integrating communications of the second endpoint into the SIP communication session between the first endpoint and the third endpoint.

2. The method of claim 1, wherein the request from the second endpoint of the plurality of endpoints comprises an invite with a join header and a call info header.

3. The method of claim 1, further comprising receiving from the first endpoint a remote call control line key event message specifying a privacy status.

4. The method of claim 1, further comprising receiving a lock request from the first endpoint to invoke a select feature to lock the SIP communication session.

5. The method of claim 4, further comprising, upon receiving the lock request, locking the SIP communication session so that a fourth endpoint of the plurality of endpoints being served by the single shared line cannot resume the communication session with the second endpoint.

6. The method of claim 5, wherein:

the lock request is generated by the communications platform when the communication session is placed on hold.

7. The method of claim 1, further comprising:

receiving a request from the first endpoint to exit the SIP communication session; and replacing the first endpoint with the second endpoint in the SIP communication session.

8. A system for implementing a Session Initiation Protocol (SIP) feature, comprising:

a processor configured to:

serve a plurality of endpoints via a shared line implementing a shared line protocol, the plurality of endpoints comprising at least a first endpoint and a second endpoint serviced by the shared line; and establish a SIP communication session via a communications platform, the SIP communication session being between a first endpoint and a third endpoint, the communications platform implementing the shared line protocol to serve a plurality of endpoints using a single shared line, the third endpoint not one of the plurality of endpoints being served by the shared line; and an interface coupled to the processor and configured to:

after the establishment of the SIP communication session between the first endpoint and the third endpoint, send, via the communications platform, a remote state notification comprising call information notifying the plurality of endpoints served by the single shared line of the SIP communication session; and receive a request from a second endpoint to join the SIP communication session between the first endpoint and the third endpoint;

wherein the processor is further configured to integrate communications of the second endpoint into the SIP communication session between the first endpoint and the third endpoint.

9. The system of claim 8, wherein the request from the second endpoint of the plurality of endpoints comprises an invite with a join header and a call info header.

10. The system of claim 8, wherein the interface is further configured to receive from the first endpoint a remote call control line key event message specifying a privacy status.

11. The system of claim 8, wherein the interface is further configured to receive a lock request from the first endpoint to invoke a select feature to lock the SIP communication session.

12. The system of claim 11, wherein, upon receiving the lock request, the processor is further configured to lock the SIP communication session so that a fourth endpoint of the plurality of endpoints being served by the shared line cannot resume the SIP communication session with the second endpoint.

13. The system of claim 12, wherein the lock request is generated by the communications platform when the SIP communication session is placed on hold.

14. The system of claim 8, wherein:
the interface is further configured to receive a request from the first endpoint to exit the SIP communication session; and
the processor is further configured to replace the first endpoint with the second endpoint in the SIP communication session.

15. Logic embodied in a non-transitory computer readable medium, the non-transitory computer readable medium comprising code operable to:
serve a plurality of endpoints via a shared line implementing a shared line protocol, the plurality of endpoints comprising at least a first endpoint and a second endpoint serviced by the shared line;
establish a Session Initiation Protocol (SIP) communication session via a communications platform, the SIP communication session being between a first endpoint and a third endpoint, the communications platform implementing the shared line protocol to serve a plurality of endpoints using a single shared line, the third endpoint not one of the plurality of endpoints being served by the shared line;
after establishing the SIP communication session between the first endpoint and the third endpoint, send, via the communications platform, a remote state notification comprising call information notifying the plurality of endpoints served by the single shared line of the SIP communication session;
receive a request from the second endpoint to join the SIP communication session between the first endpoint and the third endpoint; and
integrate communications of the second endpoint into the SIP communication session between the first endpoint and the second endpoint.

16. The medium of claim 15, wherein the request from the second endpoint of the plurality of endpoints comprises an invite with a join header and a call info header.

17. The medium of claim 15, wherein the logic is further configured to receive from the first endpoint a remote call control line key event message specifying a privacy status.

18. The medium of claim 15, wherein the logic is further configured to receive a lock request from the first endpoint to invoke a select feature to lock the SIP communication session.

19. The medium of claim 18, wherein, upon receiving the lock request, the logic is further configured to lock the SIP communication session so that a fourth endpoint of the plurality of endpoints being served by the shared line cannot resume the SIP communication session with the second endpoint.

20. The medium of claim 19, wherein the lock request is generated by the communications platform when the SIP communication session is placed on hold.

21. The medium of claim 15, wherein the logic is further configured to:
receive a request from the first endpoint to exit the SIP communication session; and
replace the first endpoint with the second endpoint in the SIP communication session.

22. The method of claim 5, wherein the lock request is generated by the SIP communications platform when the communication session is placed on hold.

* * * * *